US009275407B2

(12) United States Patent
McLaughlin et al.

(10) Patent No.: US 9,275,407 B2
(45) Date of Patent: Mar. 1, 2016

(54) SYSTEMS AND METHODS TO IMPLEMENT POINT OF SALE (POS) TERMINALS, PROCESS ORDERS AND MANAGE ORDER FULFILLMENT

(75) Inventors: Quinn McLaughlin, Santa Cruz, CA (US); Ben Harris Lyon, Tiburon, CA (US)

(73) Assignee: LivingSocial, Inc., Washington, DC (US)

( * ) Notice: Subject to any disclaimer, the term of this patent is extended or adjusted under 35 U.S.C. 154(b) by 84 days.

(21) Appl. No.: 12/906,876

(22) Filed: Oct. 18, 2010

(65) Prior Publication Data

US 2011/0125566 A1 May 26, 2011

Related U.S. Application Data

(60) Provisional application No. 61/259,107, filed on Nov. 6, 2009, provisional application No. 61/390,580, filed on Oct. 6, 2010.

(51) Int. Cl.
*G06Q 30/00* (2012.01)
*G06Q 20/00* (2012.01)
*G06Q 30/06* (2012.01)
*G06Q 20/20* (2012.01)
*G06Q 30/02* (2012.01)

(52) U.S. Cl.
CPC ............... *G06Q 30/06* (2013.01); *G06Q 20/20* (2013.01); *G06Q 20/209* (2013.01); *G06Q 30/0222* (2013.01)

(58) Field of Classification Search
CPC ...................................................... G06Q 30/00
USPC ........................................................ 705/26.1
See application file for complete search history.

(56) References Cited

U.S. PATENT DOCUMENTS

| | | | |
|---|---|---|---|
| 6,163,772 A | 12/2000 | Kramer et al. | |
| 6,178,409 B1 | 1/2001 | Weber et al. | |
| 6,779,720 B2 | 8/2004 | Lewis | |
| 6,862,575 B1 | 3/2005 | Anttila et al. | |
| 7,458,507 B2 | 12/2008 | Fillinger et al. | |
| 7,672,901 B1 | 3/2010 | Bent et al. | |
| 7,716,089 B1* | 5/2010 | Gavarini | 705/26.8 |
| 8,099,316 B2 | 1/2012 | Moukas et al. | |
| 8,160,916 B2 | 4/2012 | Moukas et al. | |
| 2002/0026378 A1* | 2/2002 | Inoue | 705/26 |
| 2006/0149640 A1 | 7/2006 | Gordon et al. | |

(Continued)

OTHER PUBLICATIONS

International Patent Application No. PCT/US2010/055678, International Search Report and Written Opinion, mailed Jun. 29, 2011.

(Continued)

*Primary Examiner* — Ariel Yu
(74) *Attorney, Agent, or Firm* — Fish & Richardson P.C.

(57) ABSTRACT

Systems and methods to integrate point of sale processing, online order processing, and supply chain and store management over the Internet. In one aspect, a central server provides point of sale, online order processing, and supply chain and store management functions via browser based interfaces. The system enables users to enter orders from remote locations for order fulfillment at brick and mortar retail locations, where the POS terminals configured based on the browser based interfaces can be changed into a self service mode to allow customers to place orders for themselves at the retail locations.

26 Claims, 11 Drawing Sheets

(56) References Cited

U.S. PATENT DOCUMENTS

| | | |
|---|---|---|
| 2006/0282398 A1 | 12/2006 | Mueller et al. |
| 2007/0007331 A1* | 1/2007 | Jasper et al. ............... 235/379 |
| 2007/0294096 A1 | 12/2007 | Randall et al. |
| 2008/0052189 A1 | 2/2008 | Walker et al. |
| 2008/0228507 A1 | 9/2008 | Larue et al. |
| 2008/0306886 A1 | 12/2008 | Otto et al. |
| 2008/0319843 A1 | 12/2008 | Moser et al. |
| 2009/0070228 A1* | 3/2009 | Ronen ............................ 705/26 |
| 2009/0076875 A1* | 3/2009 | Lert et al. ........................ 705/8 |
| 2009/0106085 A1* | 4/2009 | Raimbeault ..................... 705/10 |
| 2009/0132311 A1* | 5/2009 | Klinger et al. .................... 705/7 |
| 2009/0204496 A1* | 8/2009 | Otto et al. ....................... 705/14 |
| 2009/0259557 A1* | 10/2009 | Carroll et al. ................... 705/17 |
| 2009/0276305 A1 | 11/2009 | Clopp |
| 2010/0030578 A1* | 2/2010 | Siddique et al. ................. 705/3 |
| 2010/0179868 A1* | 7/2010 | del Rosario ................ 705/14.16 |
| 2011/0022657 A1* | 1/2011 | Zhu et al. ...................... 709/204 |
| 2011/0029370 A1* | 2/2011 | Roeding et al. ............ 705/14.38 |
| 2011/0066488 A1 | 3/2011 | Ludewig et al. |
| 2012/0191522 A1 | 7/2012 | McLaughlin et al. |

OTHER PUBLICATIONS

Non-final Office Action mailed Sep. 16, 2013 from U.S. Appl. No. 13/354,947, 8 pages.

Final Office Action mailed Apr. 16, 2014 from U.S. Appl. No. 13/354,947, 13 pages.

Advisory Action mailed Aug. 27, 2014 in U.S. Appl. No. 13/354,947, 3 pages.

International Preliminary Report on Patentability issued May 8, 2012 in International Application No. PCT/US2010/055678, 5 pages.

* cited by examiner

← 2200

○ ○ ○ / ○ LineMonkey × \ + \
⟲ ☆ | https://localhost/store/order

Order Total

← 2220

Caffe Africano $6.75
| 8oz | to go | whole | no syrup | no whip | regular | No Cup $3.00

Fruit Cup $3.75
| To Go |

← 2240

| Coupon |
| Tax |
| Cash |
| Card |
| Manual |
| Gift |

Amount $20.00

← 2280

| Amount | | | |
|---|---|---|---|
| 1.00 | 5.00 | 10.00 | 20.00 |
| 7 | 8 | 9 | 50.00 |
| 4 | 5 | 6 | 100.00 |
| 1 | 2 | 3 | Clear |
| 0 | 00 | Enter | |

Pg Up | PgDn

Exit

No LineMonkey Order Pending
Checking in 5 second(s)

Tue Oct 27 2009 10:38:09 PM

○ ○ ○ / ○ LineMonkey × \ +

[https://linemonkey.com/transactions]

◱ LineMonkey    CLOSED | Menu Items | Accounting | Store Settings
  Private Beta                  Logged in as Quinn McLaughlin Users | Payments | Transactions | Shift Report | Day Report | Month Report
Transactions
Total Amount: -2.0

| id | created_at | user_id | staff_id | purchase_id | order_id | txn_type | amount |
|---|---|---|---|---|---|---|---|
| 5350 | 2009-10-27 13:35:22 -0700 | octagon | (none) | (none) | 2869 | purchase:cash | $-5.90 |
| 5349 | 2009-10-27 19:35:22 -0700 | octagon | (none) | (none) | 2869 | order | $5.90 |
| 5348 | 2009-10-27 19:34:32 -0700 | octagon | (none) | 630 | 2868 | purchase:visa | $-12.45 |
| 5347 | 2009-10-27 19:34:32 -0700 | octagon | (none) | (none) | 2868 | order | $12.45 |
| 5346 | 2009-10-27 19:29:45 -0700 | octagon | (none) | (none) | 2867 | purchase:cash | $-2.75 |
| 5345 | 2009-10-27 19:29:45 -0700 | octagon | (none) | (none) | 2867 | order | $2.75 |
| 5344 | 2009-10-27 19:24:34 -0700 | octagon | (none) | 629 | 2866 | purchase:master | $-9.95 |
| 5343 | 2009-10-27 19:24:34 -0700 | octagon | (none) | (none) | 2866 | order | $9.95 |
| 5342 | 2009-10-27 19:18:07 -0700 | octagon | (none) | (none) | 2865 | purchase:cash | $-1.04 |
| 5341 | 2009-10-27 19:18:07 -0700 | octagon | (none) | (none) | 2865 | tax | $0.09 |
| 5340 | 2009-10-27 19:18:07 -0700 | octagon | (none) | (none) | 2865 | order | $0.95 |
| 5339 | 2009-10-27 18:50:51 -0700 | octagon | (none) | (none) | 2864 | purchase:master | $-3.23 |
| 5338 | 2009-10-27 18:50:51 -0700 | octagon | (none) | 628 | 2864 | tax | $0.28 |
| 5337 | 2009-10-27 18:50:51 -0700 | octagon | (none) | (none) | 2864 | order | $2.95 |
| 5336 | 2009-10-27 18:39:35 -0700 | octagon | (none) | (none) | 2863 | purchase:cash | $-2.20 |
| 5335 | 2009-10-27 18:39:35 -0700 | octagon | (none) | (none) | 2863 | order | $2.20 |
| 5334 | 2009-10-27 18:32:58 -0700 | octagon | (none) | (none) | 2862 | purchase:cash | $-3.00 |
| 5333 | 2009-10-27 18:32:58 -0700 | octagon | (none) | (none) | 2862 | order | $3.00 |
| 5332 | 2009-10-27 18:26:28 -0700 | octagon | (none) | (none) | 2861 | purchase:cash | $-2.75 |
| 5331 | 2009-10-27 18:26:28 -0700 | octagon | (none) | (none) | 2861 | order | $2.75 |

SYSTEMS AND METHODS TO IMPLEMENT POINT OF SALE (POS) TERMINALS, PROCESS ORDERS AND MANAGE ORDER FULFILLMENT

CROSS-REFERENCE TO RELATED APPLICATIONS

This application claims priority to U.S. Prov. Pat. App. Ser. No. 61/259,107, filed Nov. 6, 2009, and U.S. Prov. Pat. App. Ser. No. 61/390,580, filed Oct. 6, 2010 the disclosures of which applications are incorporated herein by reference in their entirety.

FIELD OF THE TECHNOLOGY

At least some embodiments disclosed herein relate, in general, to order placement, point of sale, and/or order fulfillment for products and/or services provided in retail locations (400), such as restaurants, fast food chains, coffee shops, bars, clubs and other retail establishments.

BACKGROUND

Small businesses face significant challenges in adapting to, and taking advantage of, an increasingly networked world. The Internet (800) has opened up new opportunities and challenges for retailers to better service their customers. The Internet (800) can provide a vehicle for customers to place orders online. Some retailers provide systems that enable customers to place orders online. However, such dedicated systems are typically out of reach for many businesses from a cost standpoint.

To attract customers, some retailers permit customers to use the access point (440) to access internet (800) without requiring the customers to make purchases. Other retailers provide customers with access codes on purchase receipts (1400); and the customers can use the access codes to log into the in-store wireless networks for a limited period of time.

BRIEF DESCRIPTION OF THE DRAWINGS

The embodiments are illustrated by way of example and not a limitation to the figures of the accompanying drawings in which like references indicate similar elements.

FIG. 5 illustrates an embodiment of an interface for a store employee to display an order in process, specify tender types and enter payment amounts.

FIG. 6 illustrates an embodiment of a pop-up window launched from the interface in FIG. 5 for customizing orders with product options and purchase options.

FIG. 8 illustrates an embodiment of a report of the most recent transactions at a store.

DETAILED DESCRIPTION

Figure 1:
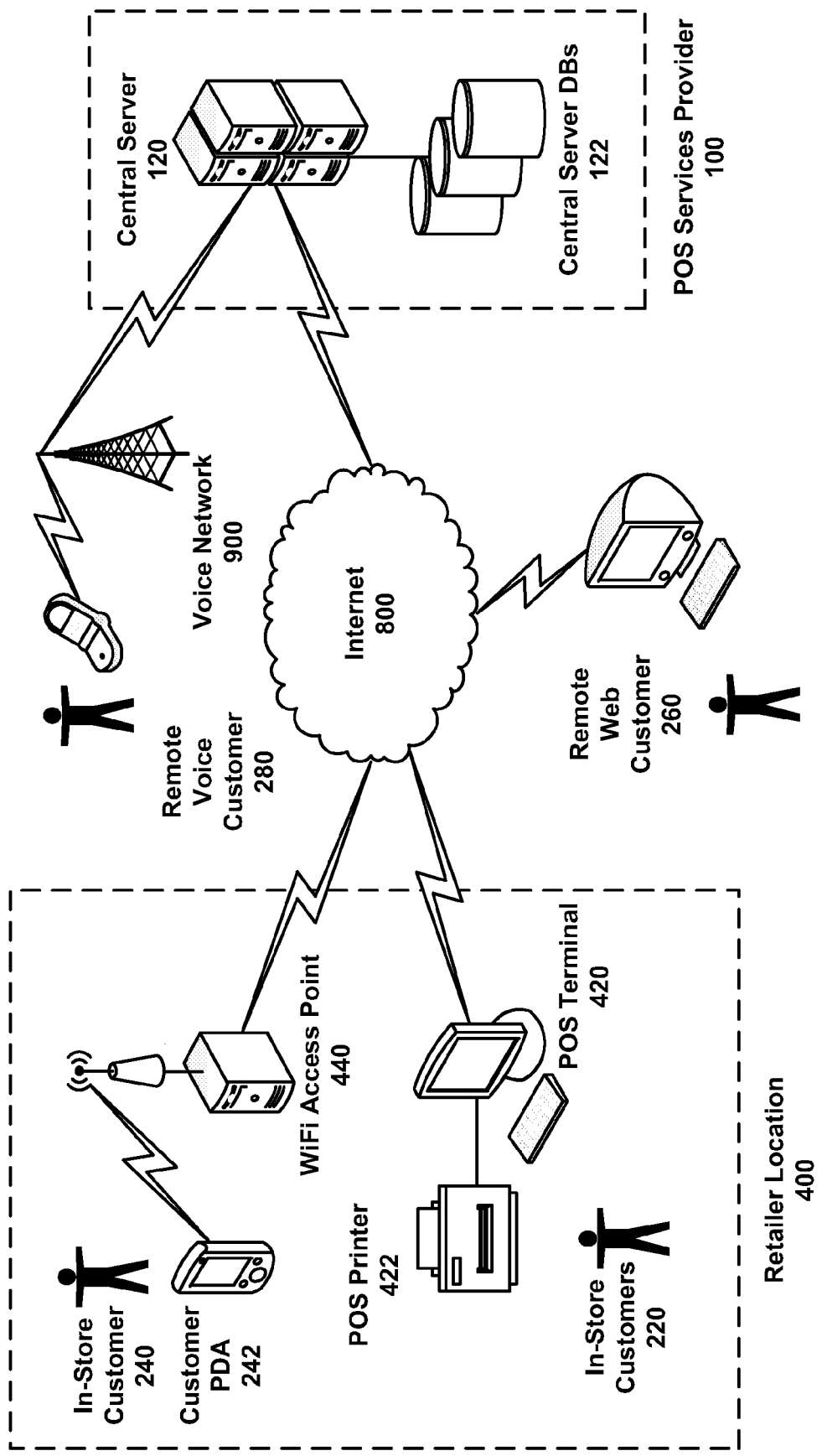
FIG. 1 illustrates one embodiment of a web based point of sale and store management system.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, "social media" includes electronically-stored information that users send or make available to other users for the purpose of interacting with other users in a social context. Such media can include directed messages, status messages, broadcast messages, audio files, image files and video files. In one embodiment, "social media websites" or "social networking websites" include a website that facilitates the exchange of social media between users. Examples of such websites includes social networking websites such as Facebook and LinkedIn, microblogging websites such as Twitter, local-based social networking websites such as Foursquare, and websites to provide discount offers to a group, such as Groupon.

In one embodiment, "Point of Sale" or "POS" systems include a system for processing customer orders at a point where the product is physically delivered (1700) to customers. Such systems could include devices for controlling cash registers, payment card readers, receipt printers and/or barcode scanners. In one embodiment, a POS system is to be provided by software operating on specialized hardware, and could additionally provide for, without limitation, tracking and managing store-level inventory, ordering for inventory products and supplies and coordinating inventory with sales, as well as tracking employee information, such as employee hours and/or sales.

In one embodiment, "transactions" include an event by which a retailer receives income or incurs a liability. Income events could include sales of products, whether online or at a brick-and-mortar location. Liability events could include sales of products from wholesalers or other types of suppliers, whether to fulfill customer orders, replenish stock or obtain store supplies (e.g. register tapes). Liability events could also include the logging of hours worked by employees.

In one embodiment, a system is provided to allow customers of retailers to place their own orders and reduce or eliminate their waiting in line. In one embodiment, the order system is also integrated with point-of-sale systems at brick-and-mortar locations to provide in-store sales and management capabilities, replacing expensive, specialized, hardware and software. Further, in one embodiment, the system is configured to provide centralized management of inventory, distribution and store management and control.

Various embodiments of the systems and methods disclosed herein relate to systems that provide integrated order processing and management for restaurants, coffee shops, and similar retail businesses via the Internet (800). FIG. 1 illustrates one embodiment of a web based POS and store management system. A POS services provider (100) provides at least one centralized server (120) that implements functionality to take orders from customers (220, 240, 260 and 280) via various channels.

In one embodiment, the system implements point-of-sale functionality at brick-and-mortar retail locations (400) via point of sale terminals (420) which can include point of sale printers (422) and payment card readers (not shown). The point of sale terminals (420) enable in-store employees to receive purchase orders from in-store customers (220), for example, at conventional check stands. In one embodiment, the POS terminal (420) provide a browser based interface to the order taking system hosted on central servers (120), and to show the list of pending orders for fulfillment. In one embodiment, a POS terminal (420) can be turned into a self-service terminal when the shop employee/cashier is absent, where, in one embodiment, the terminal displays a interface similar to, or identical to the web-based ordering interface provided to customers (260) located remote to the store over the Internet (800) (discussed in detail below).

In one embodiment, the central servers (120) interfaces with and controls WiFi access points (440) at store locations 400 to allow customers (e.g. 220, 240, 260 and 280) having WiFi enabled devices (e.g. 242) to place orders through their devices and the WiFi access points and thus, gain Internet (800) access via the WiFi access points (440) as a result of such orders. In one embodiment, the central servers (120) allows merchants to track customer activities conducted via the WiFi access points (440) and to direct advertisements to such customers on the basis of such activities.

In one embodiment, many aspects of POS terminal (420) functionalities are provided by POS terminal (420) via a web browser-based application running on the central servers (120) over the Internet (800), such as order queue, payment card processing (e.g., processing credit cards, debit cards, bank cards). In one embodiment, the majority of the POS terminal (420) functionalities are available via browser-based software loaded on, for example, a USB drive, even when the network connection to the central servers (120) is not available. In one embodiment, the software implementing the functionalities of the POS terminal (420) can be installed via online download from the central servers (120). In one embodiment, when the network connection to the central servers (120) is available, the POS terminal (420) are operated by the real time data from the central servers (120). In one embodiment, when the network connection to the central servers (120) is not available, or temporarily interrupted, the POS terminal (420) is to continue run in a stand alone mode to process orders in the queue and new orders placed directly on the POS terminal (420), and synchronize with the central servers (120) when the network connection to the central servers (120) is re-established.

In one embodiment, the system additionally provides a web-based ordering interface that allows customers (260) located remote to brick-and-mortar retail locations (400) to place orders for later pick up at brick-and-mortar retail locations (400). In one embodiment, the orders can be delivered to a location specified by the customer (260). In one embodiment, the ordering interface is provided by an application running on the central servers (120) over the Internet (800). A user may access the application via a web-browser, or a mobile application (e.g., running on a mobile phone). In one embodiment, the ordering interface allows customers to associate previously placed orders with keywords, allowing an order to be resubmitted by providing the keyword associated with the order.

In one embodiment, the central servers (120) provides order processing services as described above to a large number of merchants and customers of such merchants, and accepts orders from widely distributed locations, including retail locations (400) and customers who have access to the Internet (800) via Internet connected user devices. Regardless of where and/or how customer orders are placed, the system dispatches the orders to POS terminal (420) at the appropriate retail locations (400). In one embodiment, the central servers (120) dispatches one or more order queues, tracks pick up times, provides notification of delays in order fulfillment, and so forth. In one embodiment, retailer's employees can sign in to the central servers (120) from the POS terminal (420) or a remote location to see the queue of orders.

In one embodiment, the system additionally provides a voice-based, touch-tone and/or text message ordering interface that allows customers (280) located remote to brick-and-mortar retail locations (400) to place orders, for example, later pick up at brick-and-mortar retail locations (400). In one embodiment, such interfaces allow customers to resubmit and/or modify previously placed and/or saved orders associated with a keyword by supplying the keyword.

In one embodiment, the centralized server (120) additionally provides various store management services such as, for example, employee clock-in, inventory management, management of WiFi access within retail locations (400), remote store closing, real time promotion management, vendor payout tracking and customer subscription management.

In one embodiment, the central servers (120) additionally manages accounts for customers to allow the customers to store their personal information, payment information such as payment cards (e.g. debit and/or credit card), ordering preferences, ordering history and stored orders that can be submitted for fulfillment on demand In one embodiment, the centralized server (120) allows customers to link their social networking accounts with their account on the central servers (120) or accounts on other social networks.

In one embodiment, information obtained from social networking services is used to enhance security, for example, by obtaining information to identify a user, such as a user photograph, which is displayed with customer orders, enabling store employees to verify an the person placing the orders. In one embodiment, information obtained from social networking services is used to interact with users, for example, by posting customer orders, specials, promotions and delay notifications to users social accounts. In one embodiment, information obtained from social networking services is used to determine if a user's friends are present in, or have purchased products or services from, a retailer or a specific retail location (400).

In one embodiment the POS software and access to the central servers (120) are provided as a service and may be paid, for example, based on the transaction volume, the number of POS terminal (420), and so forth.

Ordering Processing and Fulfillment

Figure 2:
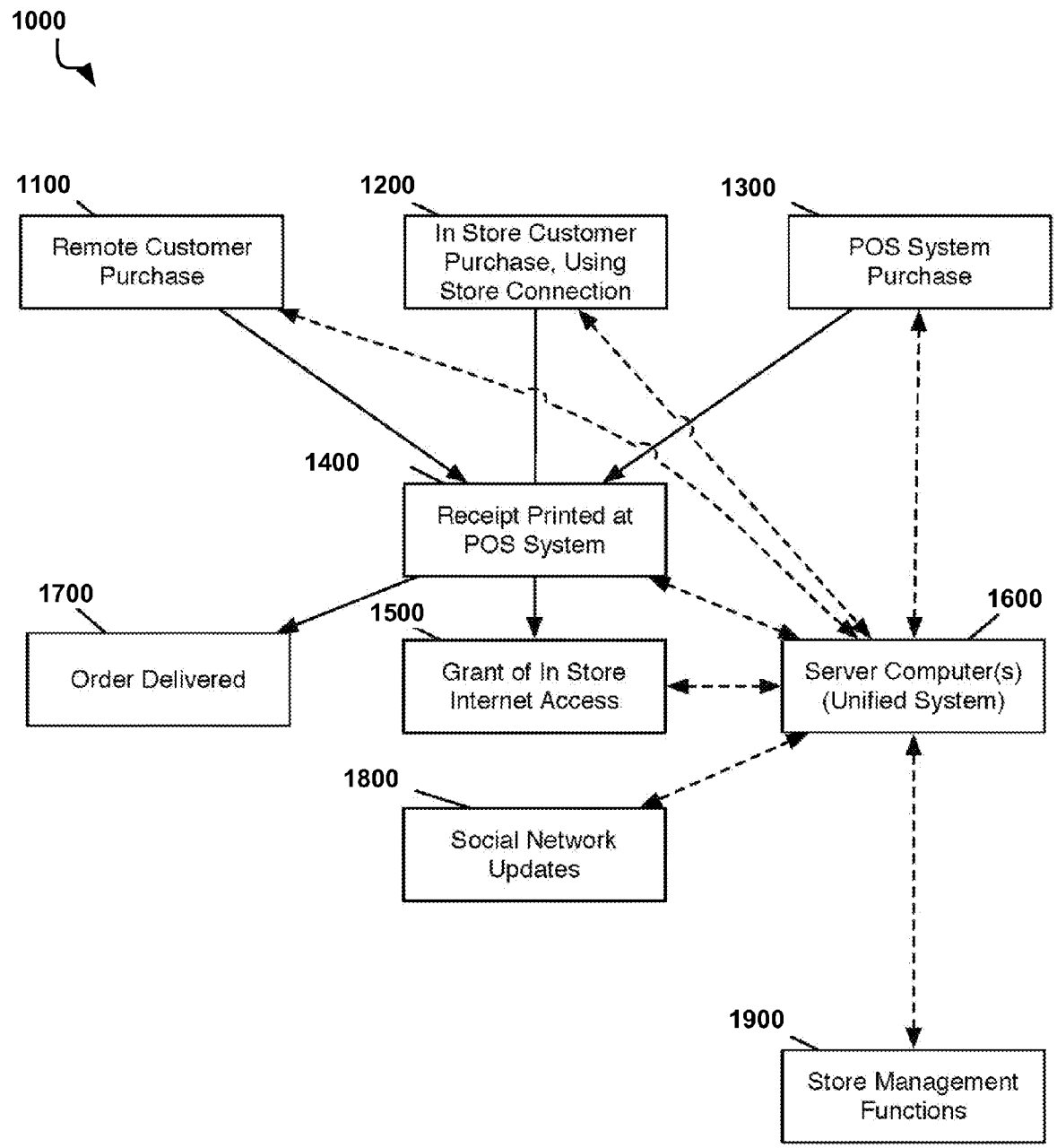
FIG. 2 illustrates an embodiment of three different ways of initiating a store order on a system for supporting in-store delivery of products (1700) and services such as that shown in FIG. 1.

FIG. 2 illustrates an embodiment of three different ways of initiating a store order on a system for supporting in-store delivery (1700) of products and services such as that shown in FIG. 1. One method of initiating a store order is reflected in block 1100, where a customer connects to a server computer (1600) (such as the Central servers (120) of FIG. 1) from a remote location over the Internet (800) and submits an order via, for example, a web-browser based interface, a mobile application based interface, or an SMS-based interface. Such connection could be made, for example, via a personal computer, laptop, PDA, a smartphone or any other device capable of providing Internet (800) access.

In one embodiment, an order for a remote customer purchase (1100) could include an identification of the customer placing the order (e.g. a user ID, credit card number, or phone number), an identification of the retailer servicing the order (e.g. a name or other unique identifier), identifies one or more products, preferences for one or more products on the order, fulfillment locations (e.g. retail locations where the order is delivered (1700)), payment information for orders and a requested pickup time. When the customer places an order online, it is reflected on the server computer (1600).

Figure 3:
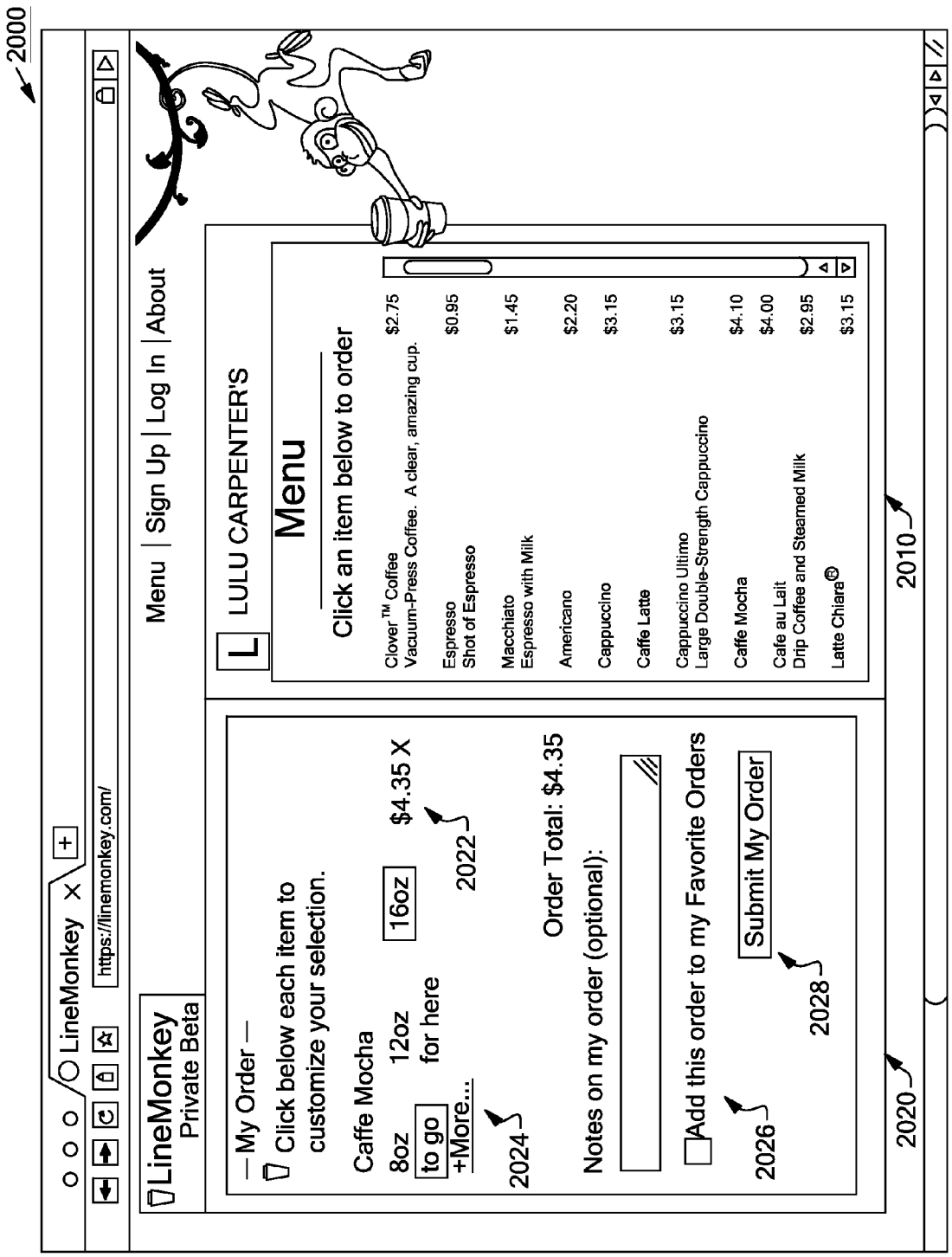
FIG. 3 illustrates an embodiment of a user interface enabling customers to place orders for products and services.

In one embodiment, the server computer (1600) serves web pages (2000) enabling online ordering, such as those shown in FIG. 3. The sample webpage (2000) provides a menu (2010) for a coffee shop and a window (2020) for adding products (2022) to a customer order and for customizing the order (2024), by, for example, providing preferences for products on the order (e.g. use skim milk in a latte). In one embodiment, the window allows the customer to save the order (2026) for submission or resubmission at a later time. In one embodiment, saved orders are stored by the server computer (1600) in association with a user account for the customer. In one embodiment, previously submitted orders are automatically retained by the server and can be resubmitted by the user at a later time. When a customer has finished specifying the order, the customer can click a submit button (2028) (e.g., via touching the submit button (2028) on a touch screen, clicking a button on a cursor control device, such as a mouse or a touch pad, while the cursor is positioned on the submit button (2028)), whereupon the customer is charged for the order and the order is dispatched to the fulfillment location and the retailer prepares the products on the order in accordance with preferences stated on the order (if any). In one embodiment, the order is added to an order queue maintained by the server computer (1600) that can be displayed at the fulfillment location and/or other remote locations. In one embodiment, the POS terminal (420) (e.g., running a script in a web page downloaded from the central server (120)) also involves in queuing the orders. Thus, even when the connection between the POS terminal (420) and the central server (120) becomes unavailable for a period of time, the POS terminal (420) can continue manage, display, and/or update the order queue via the web page. In one embodiment, the central sever (120) dispatches the orders to the POS terminal (420) without forming and managing the queue for the POS terminal (420).

In one embodiment, the system additionally provide ordering capabilities via telecommunications capabilities associated with a phone, such as, for example, via text messages, voice messages, touch-tone based messages, IP, WAP or HTTP or HTTPS requests, over a voice network (900), a cellular network, a WiFi connection and/or a wired connection.

In one embodiment, the server computer (1600) allows users to store orders previously placed by a customer in association with a keyword. In one embodiment, the stored order optionally, additionally includes an identification of a computing device of the customer. The identification of the computing device could reflect the device the customer originally used to place the stored order, or could reflect another user device known to the server computer (1600). For example, in one embodiment, an identification of a computing device of a customer on a stored order could comprise a phone number associated with a user account for the customer on the server computer (1600) or could alternatively, reflect the phone number the order was placed from.

In one embodiment, the server computer (1600) allows customers to resubmit stored orders for processing and fulfillment. In one embodiment, a customer could then remotely submit a stored order by submitting a communication to the server computer (1600) including (or consisting solely of) the keyword associated with the order. In one embodiment, the server computer (1600) can receive such communications in any format suitable for electronic communications, such as via text messages, email messages, instant message, voice messages, phone messages, etc. In one embodiment, the server computer (1600) identifies the device from which the communication originated. The identified device is then used to determine the identity of the customer submitting the order and verify that the identified device is permitted to submit the stored order for processing.

In one embodiment, server computer (1600) provides a voice response system that allows customers to submit stored orders via a voice communication to the voice response system which includes, or consists solely of, a keyword identifying a stored order. In one embodiment, the server computer (1600) identifies the phone number from which the voice communication originated. The identified phone number can then be used to determine the identity of the customer submitting the order and verify that the identified phone number is permitted to submit the stored order for processing. Additionally or alternatively, the voice response system could implement a touch-tone, or voice recognition, order submission interface that allows, for example, an order keyword to be specified using the buttons of a phone. In one embodiment, the voice response system additionally provides capabilities to modify stored orders, for example, by changing a preference for a product on an order or deleting a product from an order.

In one embodiment, voice recognition capabilities are implemented on customer devices using one or more mobile applications. In one embodiment, the mobile applications recognize a keyword for an order in a user voice message and submit the keyword to the server computer (1600) in any suitable format, such as, for example, a text message, an email or a WAP dialogue, or other network transmission. In one embodiment, the mobile applications additionally recognize voice messages comprising modifications to stored orders, for example, changes to preferences for a product on an order or deleting a product from an order. Such modifications could be submitted with the keyword the server computer (1600) for processing.

Regardless of how a request to resubmit a stored order is received, however, once the order is identified using, for example, using a keyword and an identifier for a user device, the order is retrieved, modified if applicable, and processed like any order received remotely. In one embodiment, the customer is charged for the order and the order is dispatched to the fulfillment location and the retailer prepares the products on the order in accordance with preferences stated on the order (if any). In one embodiment, the order is added to an order queue maintained by the server computer (1600) and/or the POS terminal (420) that can be displayed at the fulfillment location and/or other remote locations.

Another method of initiating a store order is reflected in block 1200, where the customer uses a network provided by the store at a brick-and-mortar location, for example, an in-store WiFi Internet connection (e.g., via a customer's mobile device). In one embodiment, the in-store WiFi Internet connection is provided via a wireless local area network access point physically located in or near the store that provides connectivity to the Internet (800). In one embodiment, the store permits customer to use the access point (440) to access internet 800 at no charge. In one embodiment, only users are permitted to use the access point (440) to access internet (800). In one embodiment, the wireless local area network access point is managed remotely by the server computers (1600).

Figure 4:
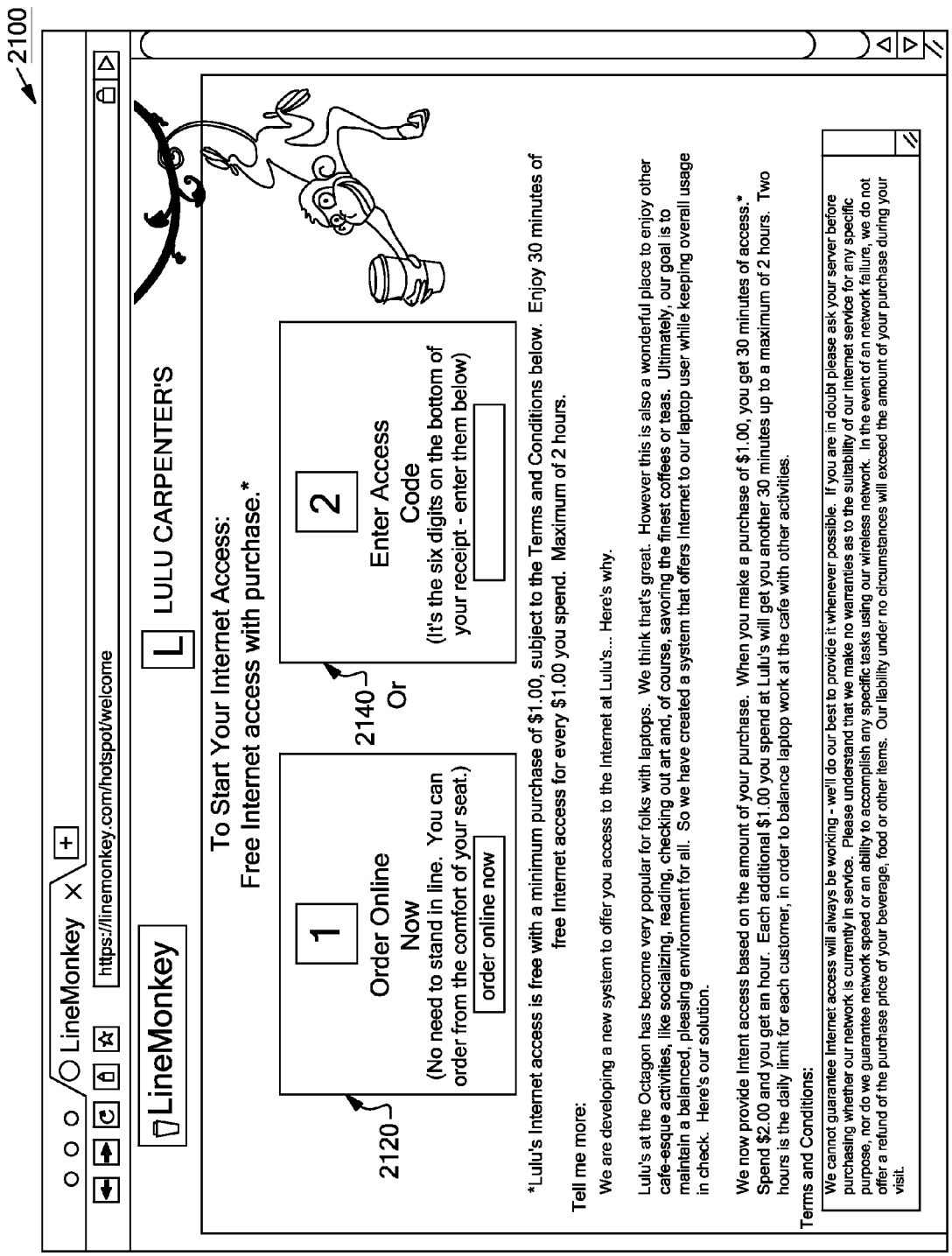
FIG. 4 illustrates an embodiment for a login page for in-store WiFi access and ordering.

In one embodiment, when an in-store customer (240) initially accesses the store's WiFi using a mobile device, the customer is routed to a default landing page for the store, such as shown in element (2100) of FIG. 4. The page provides a point (2120) to initiate an order. In one embodiment, the system may then prompt the user to login to a user account maintained by the central servers (120) using, for example, a user ID, or may automatically identify the customer based on an identifier associated with the customer's device, such as, for example, the device's hardware ID, and/or Media Access Control (MAC) address. Alternatively, the customer may not be required to login, and the customer supplies identifying information at the time of purchase. In either case, in one embodiment, the user is then routed to an order entry screen such as that shown in FIG. 3 for entry of one or more products and preferences.

In one embodiment, when the order is complete, the order is processed in a manner similar to orders received remotely. In one embodiment, the customer is charged for the order and the order is dispatched to the fulfillment location and the retailer prepares the products on the order in accordance with preferences stated on the order (if any). In one embodiment, the order is added to an order queue maintained by the server computer (1600) that can be displayed at the fulfillment location and/or other remote locations.

In one embodiment, customers can be awarded access point (440) to access internet (800) time as a premium for placing an order. In one embodiment, upon receiving payment for an order, the central servers (120) determine a length of time period the customer will be permitted to use the access point (440) to access internet (800) via the wireless local area network access point. In one embodiment, the length of time period is a flat amount per transaction (e.g. an hour). In one embodiment, the length of time period is proportional to the amount of the customer's purchase (e.g. 15 minutes for every $1.00). In one embodiment, the length of time period commences as soon as the purchase is complete, and the customer is routed to an Internet access page. In one embodiment, the length of time period commences when the customer expressly logs onto the system via an Internet access page using, for example, an order number associated with an order. In one embodiment, every time a customer makes a purchase, the length of time period is added to a total length of time period that the central servers (120) tracks via, for example, a user account for the customer.

If the customer previously placed an order, such as, for example, via remote access (e.g. 1100), the interface provides an entry window 2140 to enter in an order number. As in the case of a remote customer order, the order is reflected on a centralized server 1600 and can, in one embodiment, be displayed and modified using the interface shown in FIG. 3.

In one embodiment, WiFi management functions provided by the system are aware of specific mobile devices, such as mobile phones, iPhone/iPod/iPad, smartphones powered by an operating system such as Android, used by customers known to the central servers (120). In one embodiment, when a customer enters a WiFi coverage area with a mobile device, the WiFi access point (440) automatically detects an identifier for device (e.g. the device's hardware ID, and/or Media Access Control (MAC) address). In one embodiment, the central servers (120) then attempts to match the device identifier to customer devices known to the central servers (120), via for example, user accounts, user profiles or previous orders for the purpose of identifying the customer.

In one embodiment, if a user is positively identified using the device identifier, the central servers (120) determine if the user has a routine order (or order pattern). If the user has a regular order (or order pattern), a predicted order can be created based on the regular order or order pattern. In one embodiment, the order is dispatched to the retailer, but is not charged to the customer until it is confirmed by the customer.

In one embodiment, the customer can quickly confirm the predicted order via the customer's mobile device and pick up the order with minimum delay. For example, a swipe or bump of the customer's mobile device with a retailer's device can provide/exchange information between the mobile device and the retailer's device via Near Field Communication (NFC) capability of the mobile device to confirm an order without operating on the keys or touch screen of the mobile device. Alternatively, such a confirmation could be automatically submitted when the mobile device is within a predetermined range of the retailer's device.

Alternatively or additionally, central servers (120) transmits a message to the customer's mobile device requesting confirmation of the predicted order. Such confirmation could comprise a text message, an email, a voice message, or a landing page to access the wireless access point. The customer can then respond to the message to confirm the order.

In one embodiment, the central servers (120) tracks customer activities occurring via an in-store WiFi network. Such activities include customer purchases, as well as Internet sites visited by the customers. Such purchases and activities could then be used to select directed advertisements that are sent to customers, for example, via customer wireless devices.

A third method of initiating a store order is reflected in block 1300, where the customer is assisted by in-store personnel who take the order. In one embodiment, in-store personnel place orders using in-store POS terminal (420) via a browser based interface provided by the central servers (120) over the Internet (800). The interface can additionally provide various order management functions, such as displaying the store's order queue, displaying and printing receipts (1400) for individual order, and payment processing e.g. payment card processing (e.g., processing credit cards, debit cards, bank cards, and other payment methods, such as payment intermediary services based on phone numbers, email addresses, etc.).

Figure 6:
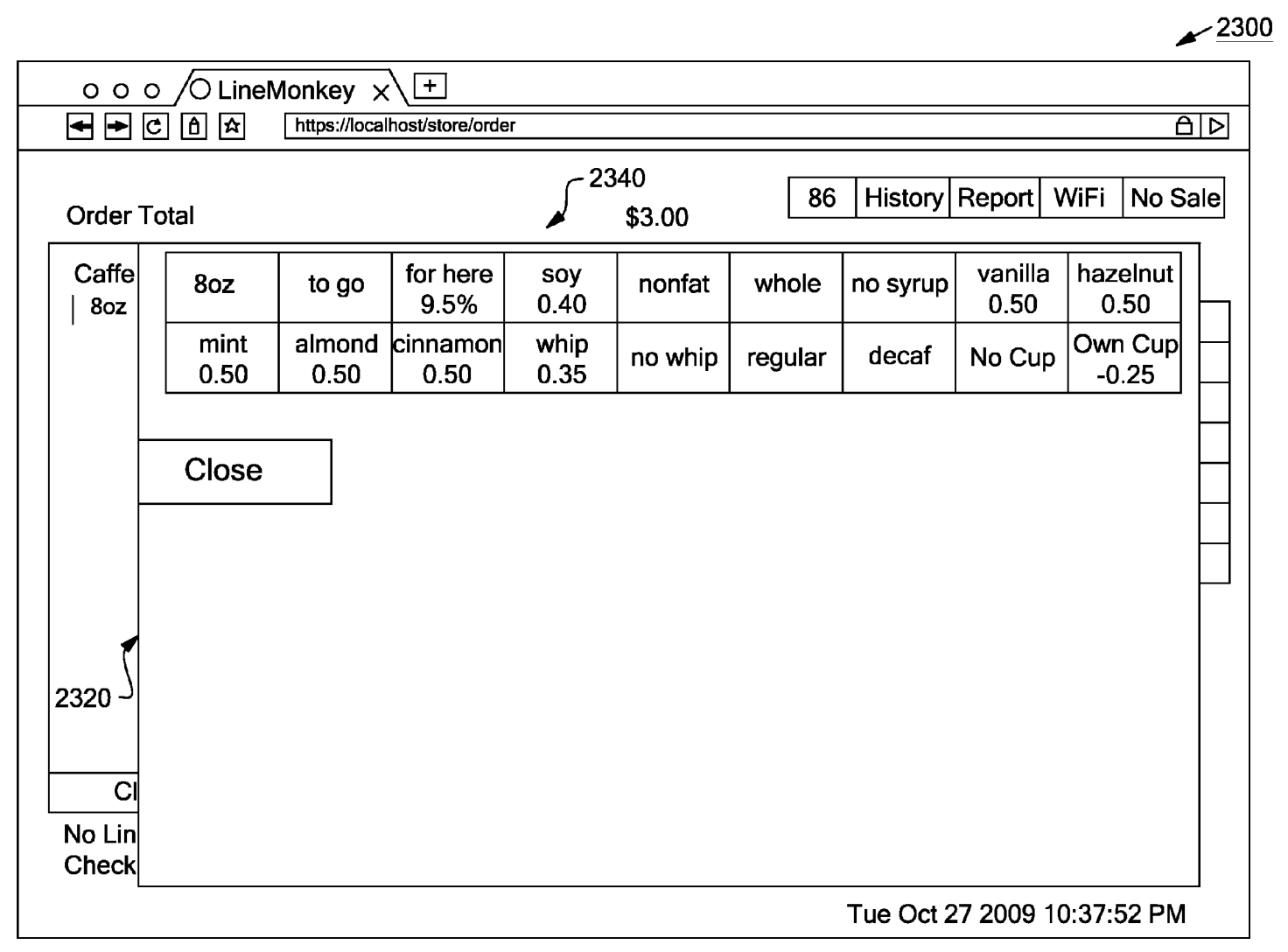

FIG. 5 illustrates one embodiment of an interface (2200) for a store employee to display an order in process (2220), specify tender types (2240) and enter payment amounts (2280). FIG. 6 illustrates a pop-up window (2320) launched from the interface in FIG. 5 for customizing orders with product preferences (2340) and add-on purchase options, such as, for example, WiFi access time. In one embodiment, the in-store POS system interface as illustrated in FIGS. 5 and 6 is tied to the central servers (120) in real time, and the order is placed using processes implemented on the server.

In one embodiment, when a customer pays for an order using a payment card, via, for example a card reader attached to a POS terminal (420), the card information is used to look up the customer's account or profile on the central servers (120) (if one exists). In one embodiment, the customer's account is used to provide information identifying information of the customer, such as a customer photograph or other similar information. In one embodiment, customer identifying information is displayed in conjunction with the store order on POS terminal (420) interfaces and is printed on order receipts (1400). In one embodiment, orders placed by the customer are stored in association with the customer account and can be used for various functions as discussed above, such as automated, predicted orders for WiFi customers as described above.

In one embodiment, when the order is complete, the order is processed in a manner similar to orders received remotely or via WiFi. In one embodiment, the customer is charged for the order and the order is dispatched to the store and the retailer prepares the products on the order in accordance with preferences stated on the order (if any). In one embodiment, the order is added to an order queue maintained by the server computer (1600) that can be displayed at the store and/or other at remote locations.

In one embodiment, the system could additionally provide a self-service mode for POS terminal (420). In one embodiment, when the terminal is in self service mode, the POS terminal (420) displays an order entry interface similar to, or identical to that provided for remote order entry such as shown in FIG. 3. In one embodiment, a user can enter an order using their user account, or alternatively, anonymously. In one embodiment, if a customer pays cash to an employee in the store where the order is placed, the user does not have to log in and can operate as an anonymous user. In one embodiment, if the user pays via a previously used credit or debit card, the system automatically links the user to his or her account.

In one embodiment, POS terminal (420) are capable of running in an offline mode when the connection to the central servers (120) is not available. In one embodiment, POS terminal (420) include program logic that continuously monitors the connection of the terminals to remote order processing service implemented on the central servers (120). When a connection to a remote order processing server is not available to a POS terminal (420), the terminal is placed in offline mode. When the POS terminal (420) is in offline mode, the terminal is to continue running the order processing software loaded from a computer readable medium locally accessible to the terminal, such as, for example, a hard drive or a USB drive, or previously downloaded from the central server (120). In one embodiment, when the POS terminal (420) is in offline mode, the order processing software is to store data on a local nonvolatile storage device (e.g., in accordance with an HTML specification) until a connection to the central server (120) becomes available to allow the data to be reported to the central server (120). In one embodiment, the order processing software is browser based and provides order entry interfaces similar or identical to those provided by the central servers (120) when the POS terminal (420) is in online mode. In one embodiment, POS terminal (420) periodically provide an audible alert when they are offline mode using a sound device operatively connected to the POS terminal (420).

In one embodiment, when a POS terminal (420) is in offline mode, transactions are stored locally on storage accessible to the POS terminal (420) and synchronized with the central servers (120) when the POS terminal (420) goes back online. The POS terminal (420) can be configured to support both cash and credit cards transactions in offline mode. In the case of credit card transactions, when the card is swiped, the card information is encrypted using a public key/private key encryption scheme, where the order processing software provides logic to encrypt the account information using a public key of the remote order processing server (the private key is only known on the order processing server) The account information is then stored in an encrypted form on the POS terminal (420). In one embodiment, the order processing software allows purchases made via a payment card to be fulfilled before the processing of payment for the purchases using customer account information, notwithstanding the fact that payment for such purchases may be declined when the order transaction is actually processed by an order processing server. The POS terminal (420) itself contains no information to decrypt the encrypted account information once the information is encrypted. In one embodiment, the POS terminal (420) does not store the swipe track from a payment card purchase. Instead, the POS terminal (420) reads the card number and name out of the swipe track and stores that information in an encrypted form.

In one embodiment, when the POS terminal (420) returns to online mode (e.g. when a lost Internet connection is restored) the POS terminal (420) synchronizes with the central servers (120). In one embodiment, the stored order transactions, which may include encrypted payment card information are automatically submitted to order processing servers. In one embodiment, the order processing servers use the private key of the public/private key encryption scheme used to decrypt encrypted payment card account information transmitted with the orders. In one embodiment, orders are submitted to credit card clearing services as ecommerce type transactions (as if the credit card numbers were submitted over Internet by the cardholders) or as hand-keyed transactions, instead of "swipe" type of transactions. When the POS terminal (420) synchronizes with the central servers (120), some transactions may be declined, however the cost of a few declines will be significantly less costly than not accepting credit cards transactions during an outage.

In one embodiment, if the POS terminal (420) is in online mode, payment account information is transmitted to the order processing server as a "card present" payment transaction, when stored transactions are transmitted to the remote order processing server becomes available after the encrypted account information is stored by the order storage logic, encrypted payment account information is transmitted to the order processing server as a "card not present" payment transaction.

In one embodiment, the public/private key encryption scheme used for encrypting payment card information for stored transactions when the POS terminal (420) is in offline mode is also used to encrypt payment information for transactions transmitted to order processing servers in real-time when the POS terminal (420) is in online mode.

In one embodiment, regardless of how the order is placed, when an order is fulfilled at a store, a receipt (1400) for the order prints at an in-store POS terminal (420). Since the server computer (1600) has previously received the order, the server can access previously stored customer information or identifiers (or identifiers stored on the mobile device of the customer), such as the customer's full name and picture (e.g., retrieved from social network sites with user's permission). A purchase card used for an in-store purchase 1300 can be used to identify a customer. In one embodiment, if a picture is available for the customer, it is printed on the receipt (1400) as a security feature. The purchaser's picture and their name help can assist store staff to verify the purchaser when an order is picked up 1700.

In one embodiment, the central servers (120) provides a user interface to store personnel for displaying the store's current order queue, which can be prioritized using various criteria, such as, for example, requested pickup time. In one embodiment, such an order queue interface can be a browser based interface provided by the central servers (120) that can be displayed on POS terminal (420) at store level, or on devices located remote to the store. In one embodiment, the order queue interface displays order details and the fulfillment status of individual orders.

In one embodiment, the order queue interface can prompt store employees that an order is to be picked up shortly (e.g., highlight an order when its pickup time is close and push other orders backwards). In one embodiment, the centralized server (120) can schedule and prioritize the orders based on the estimated/requested pickup time (in-store order and/or orders that are near their requested pick up time would be given high priority). In one embodiment, the centralized server (120) can schedule and prioritize a plurality of orders for a fulfillment location based on estimated preparation time and requested fulfillment time In one embodiment, the central servers (120) provide delay notifications to customers when there is an expected delay in order fulfillment (e.g., the central servers (120) determines there is a long order queue at a retail store and may estimate the delay based on statistical data, so that the customer can come to the store at the right time to pick up the order without have to wait). In one embodiment, the centralized server (120) sees all the orders at a retail location (400) coming from various sources and collect statistical data about order fulfillment speed/pattern, patterns of demand, and so forth, and uses such information to schedule and prioritize orders.

In one embodiment, as discussed above, the central servers (120) provide facilities to allow customers to define and maintain user accounts and/or profiles. Such accounts and/or profiles can include customer demographic information, user identification information, customer payment card information, customer device information and can be associated with various types of data relating to customers, such as, for example, customer orders with one or more retailers. Where customer payment card information is stored in a user account, the stored payment card information can be used for quick purchases online, and can be used to identify customers when a customer presents the card for purchase at a store.

In one embodiment, the central servers (120) provide facilities to allow customer accounts to be linked to user social networks (such as Facebook and/or Twitter). In one embodiment, the central servers (120) can obtain information from such social networks to identify customers, such as customer photographs. In one embodiment, the central servers (120) can interact with customers, for example, by posting customer orders, specials, promotions and delay notifications to customer's social networking accounts. In one embodiment, information obtained from social networking services is used by the central servers (120) to determine if a customer's friends are present in, or have purchased products or services from, a retailer or a specific retail location (400) and to notify the customer accordingly via one more social networks, or other Internet based groups, subgroups, meet-up groups or communities.

Figure 7:
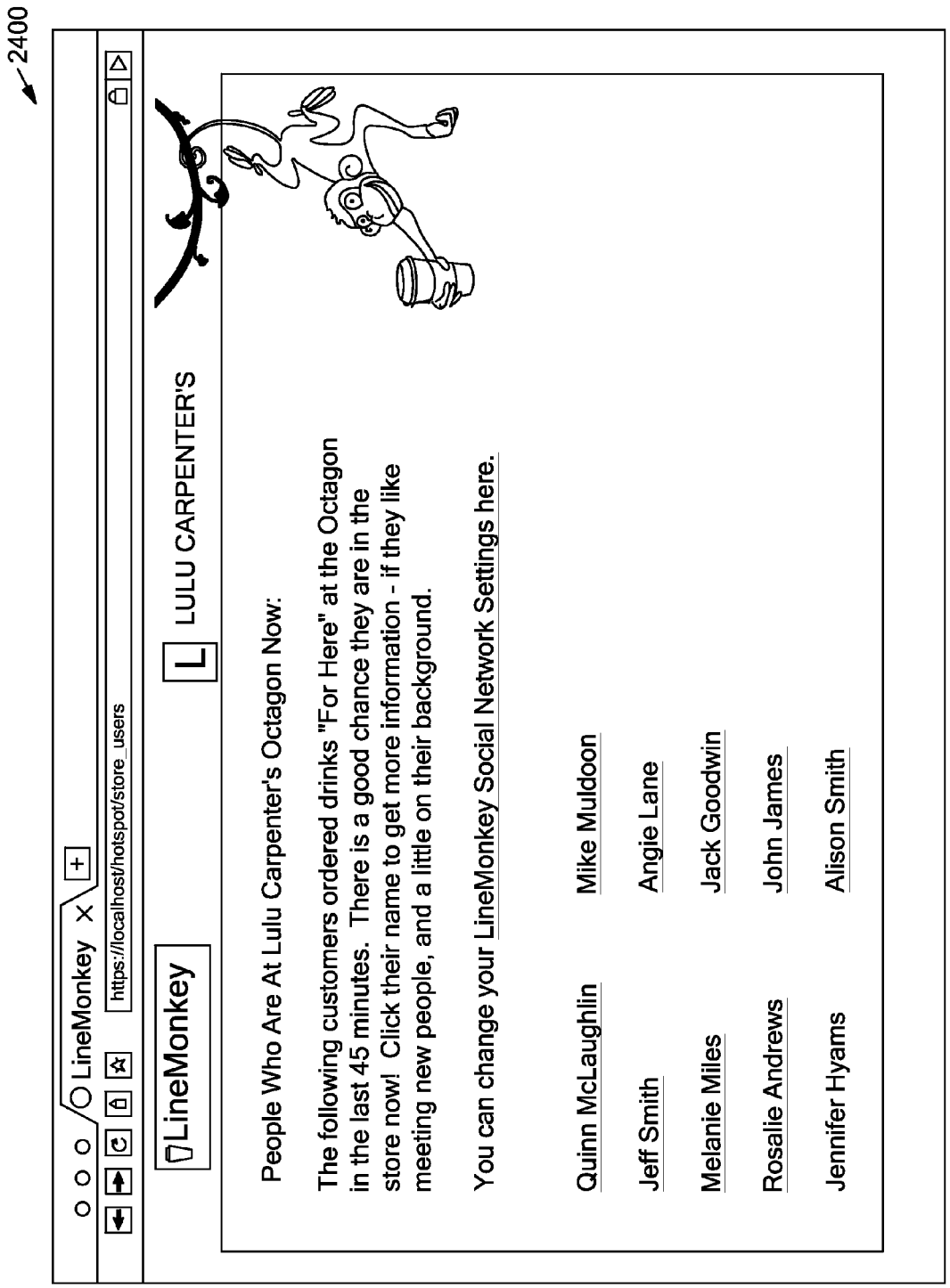
FIG. 7 illustrates an embodiment of a report of the most recent customers of a store.

In one embodiment, when an order is processed, regardless of how the order was placed, the server central servers (120) update social network information for the customer who placed the order (1800). This could include, for example a tweet on the customer's Twitter account or a post to a Facebook wall of the customer and/or the retailer. The central servers (120) could also report the most recent customers of the store on a webpage (2400) managed by, or on behalf of a retailer, for example, see FIG. 7. The system could also track customers social networks and identify friends of customers who ordered products at a retail location (400), for example, within a time period (e.g. in the last 15 minutes).

Store Management Functions

A system for supporting in-store delivery (1700) of products and services can provide store management functions (1900) separate from order processing functions. In one embodiment, such functions are handled by central servers (120) in conjunction with in-store POS functions. Such functions could include real time reporting of transactions (2500) as shown in FIG. 8. In various embodiments, the central servers (120) additionally provide functionality for clocking employees in and out at a plurality of remote locations, wireless access management functions for managing wireless access at a plurality of remote locations, inventory management functions for managing inventories at a plurality of remote locations, employee reporting for reporting employees that are clocked in; wireless usage reporting functions for reporting wireless network usage at a plurality of locations; store management functions (1900) for remotely closing one or more of the plurality of store locations, real time promotion management functions for automatic management of special promotions at a plurality of remote locations, payout tracking functions for tracking payouts to vendors at a plurality of remote locations, item management functions for managing the properties of items for sale at each of a plurality of remote locations, and customer subscription functions for managing customer subscription features. In one embodiment, the customers are provided with a user interface to not only order from the menu of the retailer, but also rate the items on the menu. In one embodiment, the customers are limited to rate the items that they have ordered. In one embodiment, based on and/or in response to the rating input from the customers, the central server (120) is to generate a discount campaign by sharing the menu choices with the friends of the customers, where the friends of the customers are identified based on account/profile information of the customers in the social networking websites.

In one embodiment, time clock functions provided via the central servers (120) include security features, for example, when employees clock in and out via a POS terminal (420), the terminal can be equipped to take a picture of the employee when a clock in or clock out event occurs. By using the picture as a form of security, time clock fraud can be minimized. The picture is recorded and stored in real time, and is available to management immediately. In one embodiment, the central servers (120) provide interfaces that allow store management to view clock in and clock out events at store level and remotely from the store.

In one embodiment, payout tracking functions provided via the central servers (120) provide real time payout tracking. In one embodiment, the POS terminal (420) could be used to record payouts to vendors. Payouts could include any payments for supplies (e.g. register tapes) or products sold at store level, such as items sold to consumers, In one embodiment, notifications could be sent to store management of any payouts, or payouts over a predetermined amount.

In one embodiment, inventory tracking functions provided via the central servers (120) include functions that allow entry of inventory counts at POS terminal (420) or via a web interface at remote locations. In one embodiment, the central servers (120) calculate changes to inventory in real-time based on processed orders. In one embodiment, notifications can be sent to store management if inventory falls below a preset level for any item. In one embodiment, central servers (120) provide an interface, displayable on the POS or a remote interface, to remove items from sale, or change the features of any item (e.g., modifiers on that item) and/or display inventory levels.

In one embodiment, subscription functions provided via the central servers (120) could include, for example, functions for automatically billing a customer at a set interval (e.g., monthly) and could additionally include features such as not having to pay for coffee or WiFi when subscribed). In one embodiment, the system could take and manage subscriptions. All three ordering methods detailed above (e.g. 1100, 1200 and 1300) could integrate with subscription features, for example, providing discounts to customers meeting pre-defined criteria. The usage of subscription features by customers could also tracked.

Figure 9:
FIG. 9 illustrates an embodiment of an interface to set store hours.

In one embodiment, WiFi management functions provided via the central servers (120) include WiFi administration functions to manage WiFi access for customers from the POS terminal (420) or from a remote interface. Such functions could include, for example, giving customers access time as a premium for purchasing products or limiting customer access. Such functions could additionally include tracking customer activities on the in-store WiFi, including web sites visited and/or Internet searches conducted. Such information could be used to send directed advertisements to customers In one embodiment, store management functions (1900) provided via the central servers (120) include functions to set store hours via a remotely accessible interface, such as, for example, the interface (2600) as shown in FIG. 9. In one embodiment, the system could provide functions to remotely close a store. In one embodiment, the central servers (120) could provide blogs and website content for the store.

In one embodiment, real time promotion functions provided via the central servers (120) include functions for real time promotion, for example, providing real time order information across a chain (at different locations) for automatic management of a special (e.g., a discounted price on an item for the first two hundred orders within a period of time). The server has the real time order and fulfillment information and thus can support real time promotions based on such information. For example, the server could allow a merchant to promote the first one hundred orders via Twitter or other social media.

Figure 10:
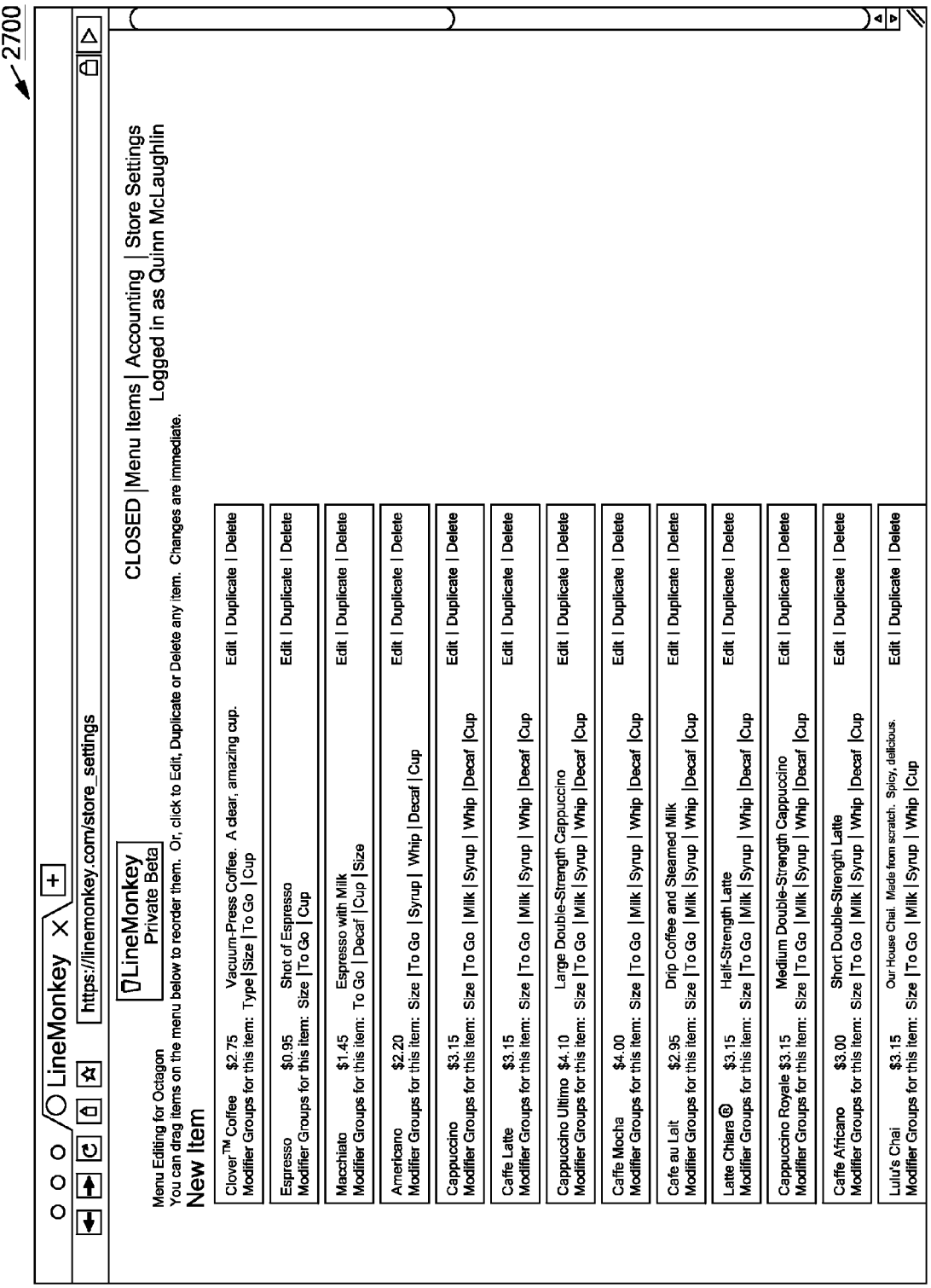
FIG. 10 illustrates an embodiment of an interface that displays changes made to various pages on the system.

In one embodiment, the central servers (120) can additionally provide tools to allow retailers and/or system administrators to modify, for example, menus, text and prices displayed on interfaces provided by the central servers (120). FIG. 10 shows one embodiment of an interface (2700) that displays changes made to various pages on the system.

Figure 11:
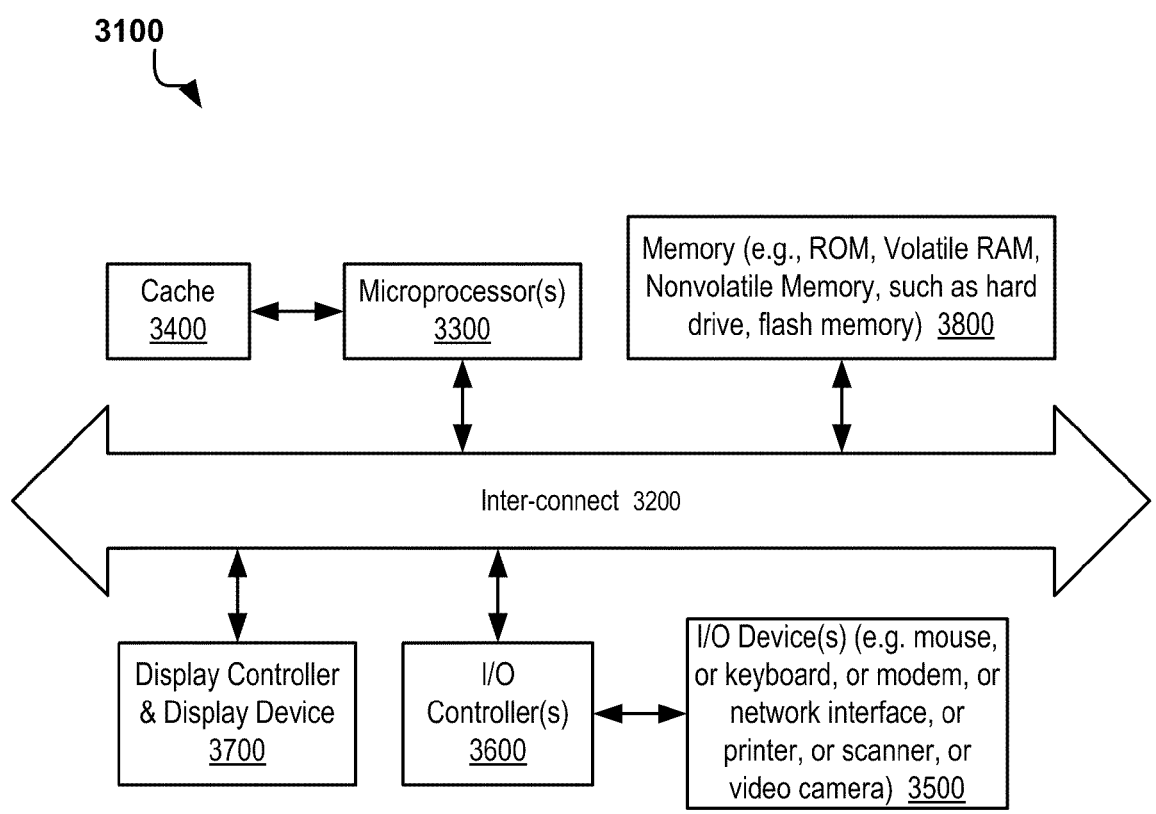
FIG. 11 shows a block diagram of a data processing system which can be used in various embodiments of the disclosed systems and methods.

FIG. 11 shows a block diagram of a data processing system 3100 which can be used in various embodiments of the disclosed system and method. While FIG. 11 illustrates various components of a computer system, it is not intended to represent any particular architecture or manner of interconnecting the components. Other systems that have fewer or more components may also be used. In one embodiment, one or more data processing systems, such as that shown in 3100 of FIG. 11, implement central servers (120) and the POS terminal (420) of FIG. 1 shown in FIGS. 1 and 2. Other configurations are possible, as will be readily apparent to those skilled in the art.

In FIG. 11, the data processing system 3100 includes an inter-connect (3200) (e.g., bus and system core logic), which interconnects a microprocessor(s) (3300) and memory (3800). The microprocessor (3300) is coupled to cache (3400) memory in the example of FIG. 11.

The inter-connect (3200) interconnects the microprocessor(s) (3300) and the memory (3800) together and also interconnects them to a display controller and display device (3700) and to peripheral devices such as input/output (I/O) devices (3500) through an input/output controller(s) (3600). Typical I/O devices (3500) include mice, keyboards, modems, network interfaces, printers, scanners, video cameras and other devices which are well known in the art.

The inter-connect (3200) may include one or more buses connected to one another through various bridges, controllers and/or adapters. In one embodiment the I/O controller (3600) includes a USB (Universal Serial Bus) adapter for controlling USB peripherals, and/or an IEEE-1394 bus adapter for controlling IEEE-1394 peripherals.

The memory (3800) may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory (3800). Non-volatile memory (3800) is typically a magnetic hard drive, a magnetic optical drive, or an optical drive (e.g., a DVD RAM), or other type of memory (3800) system which maintains data even after power is removed from the system. The non-volatile memory (3800) may also be a random access memory (3800).

The non-volatile memory (3800) can be a local device coupled directly to the rest of the components in the data processing system. A non-volatile memory (3800) that is remote from the system, such as a network storage device coupled to the data processing system through a network interface such as a modem or Ethernet interface, can also be used.

In one embodiment, the central servers (120) of FIG. 1 are implemented using one or more data processing systems as illustrated in FIG. 11. In some embodiments, one or more servers of the system illustrated in FIG. 11 are replaced with the service of a peer to peer network or a cloud configuration of a plurality of data processing systems, or a network of distributed computing systems. The peer to peer network, or cloud based server system, can be collectively viewed as a server data processing system.

Embodiments of the disclosure can be implemented via the microprocessor(s) (3300) and/or the memory (3800). For example, the functionalities described above can be partially implemented via hardware logic in the microprocessor(s) (3300) and partially using the instructions stored in the memory (3800). Some embodiments are implemented using the microprocessor(s) (3300) without additional instructions stored in the memory (3800). Some embodiments are implemented using the instructions stored in the memory (3800) for execution by one or more general purpose microprocessor(s) (3300). Thus, the disclosure is not limited to a specific configuration of hardware and/or software.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor (3300), executing sequences of instructions contained in a memory, such as ROM, volatile RAM, non-volatile memory (3800), cache (3400) or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A computer readable storage medium can be used to store software and data which when executed by a data processing system causes the system to perform various methods. The executable software and data may be stored in various places including for example ROM, volatile RAM, non-volatile memory (3800) and/or cache (3400). Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory (3800) devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

In general, a machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A non-transitory computer-readable medium storing instructions that, when executed, cause a processor to perform operations comprising:

presenting, at a mobile device, a mobile application-based interface to a user visiting a retailer on-line;

receiving, through the mobile application-based interface at the mobile device, an indication from the user visiting the retailer on-line to connect one or more social networking accounts of the user with a user account stored at a server of the retailer;

obtaining, at the mobile device and from the server of the retailer, information identifying friends of the user;

obtaining data indicating that: (i) a subset of the identified friends of the user was present at a physical store of the retailer within a threshold time period immediately preceding the user visiting the retailer on-line, and (ii) the subset of the identified friends of the user ordered from the physical store of the retailer within the threshold time period immediately preceding the user visiting the retailer on-line, the data being generated at the server of the retailer by obtaining, from the one or more social networking accounts of the user, the information identifying the friends of the user, determining a time and location of orders placed by the friends of the user, comparing the location of the orders placed by the friends of the user with a location of the physical store of the retailer, determining whether the time of the orders placed by the friends of the user satisfies the threshold time period, and determining the subset of friends of the user that placed orders at the location of the physical store of the retailer at a time that satisfies the threshold time period;

presenting to the user, using the mobile application-based interface, information identifying the subset of the friends that have ordered from the physical store of the retailer;

obtaining, at the mobile device through the mobile application-based interface, an order from the user visiting the retailer on-line; and communicating, from the mobile device to the server of the retailer, the order from the user visiting the retailer on-line.

2. The computer-readable medium of claim 1, wherein the one or more social networking accounts of the user include a Facebook account.

3. The computer-readable medium of claim 1, wherein the order from the user further comprises payment information.

4. The computer-readable medium of claim 1, wherein the order from the user further comprises preferences for one or more products.

5. The computer-readable medium of claim 1, wherein the order from the user further comprises a requested pickup time for the order from the user.

6. The computer-readable medium of claim 1, wherein the operations comprise storing the order from the user in association with a keyword that enables the user to resubmit the order from the user at a later time using the keyword.

7. The computer-readable medium of claim 6, wherein the order from the user is stored in association with an identifier that corresponds to the mobile device.

8. The computer-readable medium of claim 6, wherein the operations comprise:

receiving, at the mobile device, a command to resubmit the stored order from the user, the command including at least the keyword that enables the user to resubmit the order from the user;

communicating, from the mobile device, the stored order to the server of the retailer such that the server of the retailer charges the user for the stored order and dispatches the stored order to the physical store of the retailer for fulfillment; and communicating, from the mobile device, the stored order to the one or more social networking accounts of the user such that the stored order is posted on the one or more social networking accounts of the user.

9. The computer-readable medium of claim 1, wherein the data is generated at the server of the retailer further by determining an identification of one or more products, and an indication that the orders placed by the friends of the user do not include a carry out order, and wherein the predetermined time period is less than one hour.

10. The computer-readable medium of claim 1, wherein the operations comprise:

responsive to communicating the order from the user visiting the retailer on-line, receiving:
one or more advertisements based on the order;
a request to confirm a future order, the future order being generated based on the order and an ordering pattern of the user; and
an award to be redeemed by the user at the physical store of the retailer, a value of the award being proportional to a purchase amount of the order from the user visiting the retailer on-line.

11. The computer-readable medium of claim 1, wherein a time component of the award is directly proportional to the purchase amount of the order from the user visiting the retailer on-line, and wherein the operations further comprise:
upon communicating a second order from the user visiting the retailer on-line, receiving an indication of an increase in the value of the award, the increase in the value of the award being proportional to a purchase amount of the second order from the user visiting the retailer on-line.

12. The computer-readable medium of claim 1, wherein the operations comprise:

receiving, through the one or more social networking accounts of the user, information indicative of a promotion offered by the retailer; and
after communicating the order from the user, providing information to the server of the retailer to configure the promotion offered by the retailer, wherein the order is associated with the promotion.

13. The computer-readable medium of claim 1, wherein obtaining data indicating that: (i) a subset of the identified friends of the user was present at a physical store of the retailer within a threshold time period immediately preceding the user visiting the retailer on-line, and (ii) the subset of the identified friends of the user ordered from the physical store of the retailer within the threshold time period immediately preceding the user visiting the retailer on-line, comprises:

receiving, at the mobile device from the server of the retailer, information indicating that one or more devices of the subset of the friends was: (i) determined, using WiFi data, to be located at the physical store of the retailer within the threshold time period immediately preceding the user visiting the retailer on-line, and (ii) used to make one or more purchases at the physical store of the retailer within the threshold time period immediately preceding the user visiting the retailer on-line.

14. A computer-implemented method comprising:

presenting, at a mobile device, a mobile application-based interface to a user visiting a retailer on-line;
receiving, through the mobile application-based interface at the mobile device, an indication from the user visiting the retailer on-line to connect one or more social networking accounts of the user with a user account stored at a server of the retailer;
obtaining, at the mobile device and from the server of the retailer, information identifying friends of the user;
obtaining data indicating that (i) a subset of the identified friends of the user was present at a physical store of the retailer within a threshold time period immediately preceding the user visiting the retailer on-line, and (ii) the subset of the identified friends of the user ordered from the physical store of the retailer within the threshold time period immediately preceding the user visiting the retailer on-line, the data being generated at the server of the retailer by obtaining, from the one or more social networking accounts of the user, the information identifying the friends of the user, determining a time and location of orders placed by the friends of the user, comparing the location of the orders placed by the friends of the user with a location of the physical store of the retailer, determining whether the time of the orders placed by the friends of the user satisfies the threshold time period, and determining the subset of friends of the user that placed orders at the location of the physical store of the retailer at a time that satisfies the threshold time period;
presenting to the user, using the mobile application-based interface, information identifying the subset of the friends that have ordered from the physical store of the retailer;
obtaining, at the mobile device through the mobile application-based interface, an order from the user visiting the retailer on-line; and
communicating, from the mobile device to the server of the retailer, the order from the user visiting the retailer on-line.

15. The method of claim 14, wherein the one or more social networking accounts of the user include a Facebook account.

16. The method of claim 14, wherein the order from the user further comprises payment information.

17. The method of claim 14, wherein the order from the user further comprises preferences for one or more products and a requested pickup time for the order from the user.

18. The method of claim 14, wherein the operations comprise storing the order from the user in association with a keyword that enables the user to resubmit the order from the user at a later time using the keyword.

19. The method of claim 18, wherein the order from the user is stored in association with an identifier that corresponds to the mobile device.

20. The method of claim 18, wherein the operations comprise:

receiving, at the mobile device, a command to resubmit the stored order from the user, the command including at least the keyword that enables the user to resubmit the order from the user;
communicating, from the mobile device, the stored order to the server of the retailer such that the server of the retailer charges the user for the stored order and dispatches the stored order to the physical store of the retailer for fulfillment; and
communicating, from the mobile device, the stored order to the one or more social networking accounts of the user such that the stored order is posted on one or more social networking accounts of the user.

21. A mobile device comprising:

one or more computers and one or more storage devices storing instructions that are operable, when executed by the one or more computers, to cause the one or more computers to perform operations comprising:

presenting, at a mobile device, a mobile application-based interface to a user visiting a retailer on-line;

receiving, through the mobile application-based interface at the mobile device, an indication from the user visiting the retailer on-line to connect one or more social networking accounts of the user with a user account stored at a server of the retailer;

obtaining, at the mobile device and from the server of the retailer, information identifying friends of the user;

obtaining data indicating that: (i) a subset of the identified friends of the user was present at a physical store of the retailer within a threshold time period immediately preceding the user visiting the retailer on-line, and (ii) the subset of the identified friends of the user ordered from the physical store of the retailer within the threshold time period immediately preceding the user visiting the retailer on-line, the data being generated at the server of the retailer by obtaining, from the one or more social networking accounts of the user, the information identifying the friends of the user, determining a time and location of orders placed by the friends of the user, comparing the location of the orders placed by the friends of the user with a location of the physical store of the retailer, determining whether the time of the orders placed by the friends of the user satisfies the threshold time period, and determining the subset of friends of the user that placed orders at the location of the physical store of the retailer at a time that satisfies the threshold time period;

presenting to the user, using the mobile application-based interface, information identifying the subset of the friends that have ordered from the physical store of the retailer;

obtaining, at the mobile device through the mobile application-based interface, an order from the user visiting the retailer on-line; and communicating, from the mobile device to the server of the retailer, the order for the user visiting the retailer on-line.

22. The mobile device of claim 21, wherein the one or more social networking accounts of the user include a Facebook account.

23. The mobile device of claim 21, wherein the order from the user further comprises payment information and a requested pickup time for the order from the user.

24. The mobile device of claim 21, wherein the operations comprise storing the order from the user in association with a keyword that enables the user at resubmit the order from the user at a later time using the keyword.

25. The mobile device of claim 24, wherein the order from the user is stored in association with an identifier that corresponds to the mobile device.

26. The mobile device of claim 24, wherein the operations comprise:

receiving, at the mobile device, a command to resubmit the stored order from the user, the command including at least the keyword that enables the user to resubmit the order from the user;

communicating, from the mobile device, the stored order to the server of the retailer such that the server of the retailer charges the user for the stored order and dispatches the stored order to the physical store of the retailer for fulfillment; and communicating, from the mobile device, the stored order to the one or more social networking accounts of the user such that the stored order is posted on the one or more social networking accounts of the user.

* * * * *